Jan. 31, 1961 K. RUDZITIS 2,969,929

LOADING MECHANISM FOR A MAGNETIC TAPE RECORDER CARTRIDGE OR THE LIKE

Filed Sept. 16, 1959 2 Sheets-Sheet 1

INVENTOR
KARL RUDZITIS
BY Eugene S. Lovett
ATTORNEY

INVENTOR
KARL RUDZITIS
BY Eugene S. Lovette
ATTORNEY

United States Patent Office 2,969,929

Patented Jan. 31, 1961

2,969,929

LOADING MECHANISM FOR A MAGNETIC TAPE RECORDER CARTRIDGE OR THE LIKE

Karl Rudzitis, West Babylon, N.Y., assignor to Telectro Industries Corp., Long Island City, N.Y., a corporation of New York Filed Sept. 16, 1959, Ser. No. 840,263

15 Claims. (Cl. 242—55.13)

The present invention relates to a loading mechanism for a magnetic tape recorder and, in particular, for a standard tape recorder cartridge, which cartridge is adapted to receive tape reels carrying magnetic tape.

It is a principal object of the present invention to provide a loading mechanism for a standard tape recorder cartridge, which mechanism in operative co-operation with the recorder automatically loads the tape carrying cartridge by vertical up and down movement so that when it is in its vertical down position, the magnetic tape is properly positioned automatically to co-operate with the magnetic heads, pressure wheels, capstans and other tape guiding structures, if any, of the recorder without requiring any adjustment for additional threading of the tape on the recorder.

It is a further object of this invention to provide a loading mechanism which automatically places the tape in operative position on a magnetic recorder and which is equally adaptable for loading other roll-like structures, on operative devices, such as a roll of film in operative position with respect to a lens of a camera.

It is a further object of the present invention to provide automatic loading device which is relatively simple and economical in fabrication and use and which is reliable in operation.

It is a further object of the present invention to provide an automatic loading mechanism which affords quick loading and unloading operation of a cartridge with the simplest of effort.

Further objects and advantages will become apparent from the following description of the invention taken in conjunction with the figures, in which.

Figure 1:
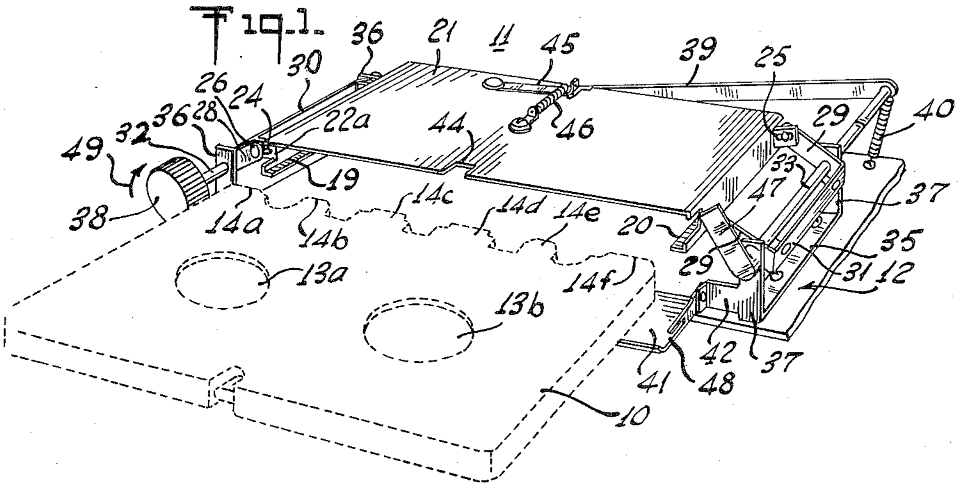
Fig. 1 is a perspective view of a conventional cartridge and is shown in spaced operative relationship to a loading device according to the present invention.
Figure 2:
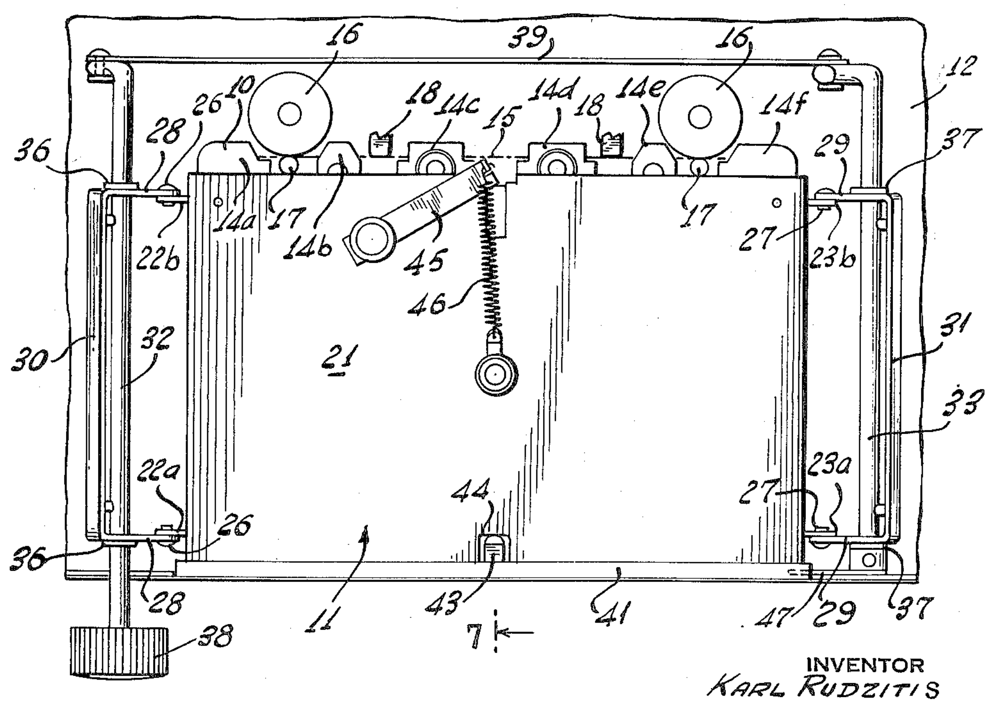
Fig. 2 is a top view of the closed cartridge loading device according to the present invention with the cartridge in loaded position.
Figures 3, 4, 5, 6:
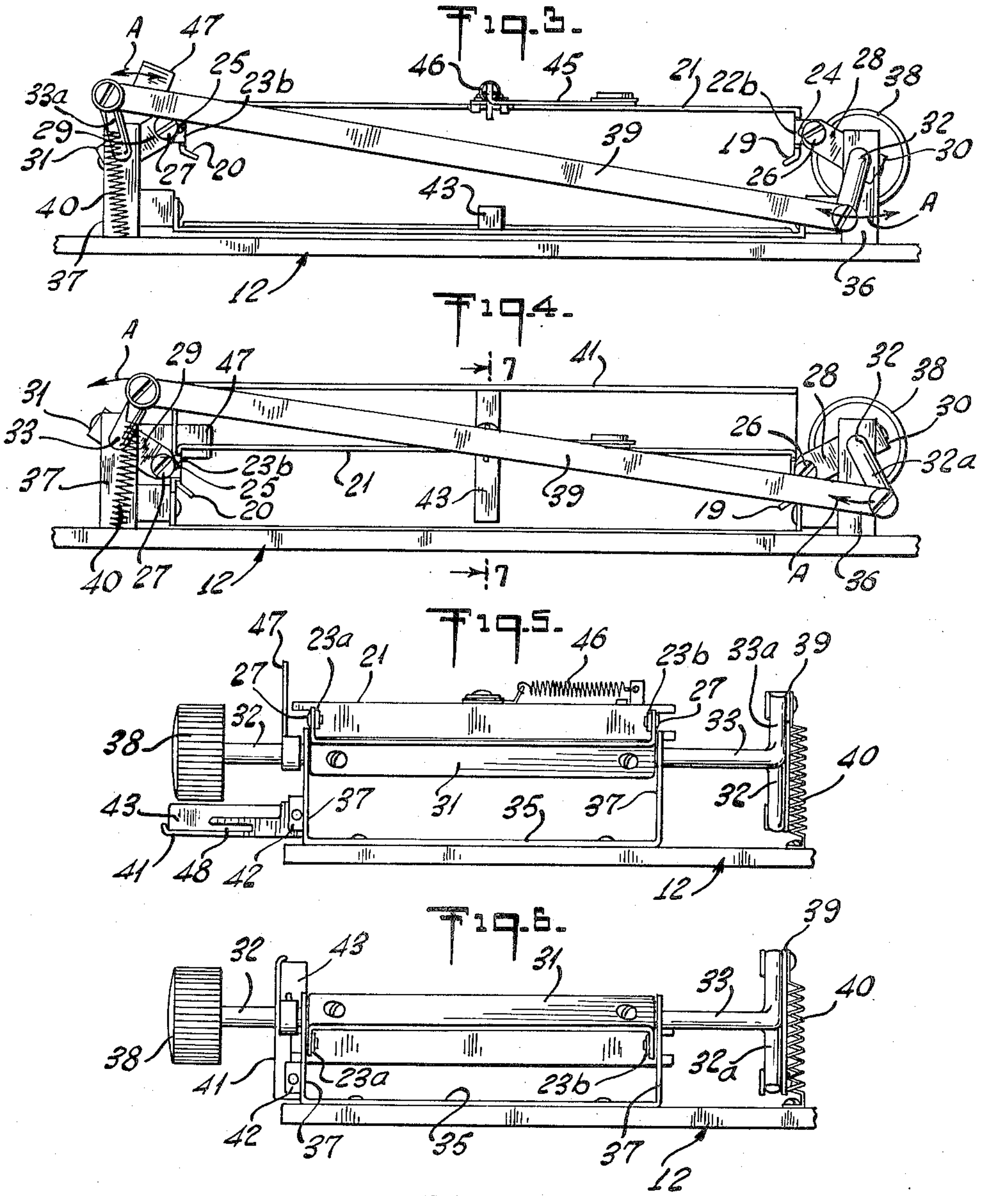
Figs. 3 and 4 are rear views of the cartridge loading device in upper and lower positions, respectively.
Figure 7:
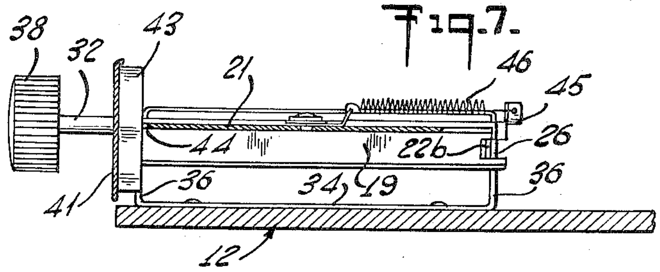

Figs. 5 and 6 are side views, seen from the right in Fig. 1, of the cartridge loading device according to the present invention in upper and lower positions, respectively; and Fig. 7 is a cross-sectional view along lines 7—7 of Figs. 2 and 4.

Reference is now made to the figures. Fig. 1 depicts a conventional magnetic tape cartridge 10 in spaced relationship in front of a loading mechanism 11 in accordance with the instant improvements. In Fig. 1, cartridge 10 is in proper position for insertion into loading means 11. Fig. 2 depicts cartridge 10 in a loaded position on a conventional magnetic tape recorder 12. Cartridge 10 includes a pair of spaced recesses 13*a*, *b* for individually retaining a full reel and a take-up reel (not shown). Suitably aligned tape guides 14*a* through 14*f* are provided along the rear edge of cartridge 10. Tape guides 14*a* through 14*f* are adapted to hold tape 15 as it extends between the two reels in straight taut relationship, whereby tape 15 automatically threads between the various and spaced pressure rollers 16 and capstans 17 to pass properly against the magnetic heads 18 by operation of loading means 11 when it drops vertically into load position on magnetic recorder 12.

Loading mechanism 11 has two spaced parallel guide tracks 19, 20 at its left and right sides. Guide tracks 19, 20 extend the full depth of loading mechanism 11 from the front to rear sides thereof. Tracks 19, 20 are aligned to accommodate slidably and support cartridge 10 when mounted in loading mechanism 11. The left and right sides of cartridge 10 freely slide along guide tracks 19, 20 when the cartridge is being inserted into or ejected from the loader 11. Tracks 19, 20 are shaped to support cartridge in a parallel planar relationship with respect to the top of magnetic recorder 20 so that when the loading mechanism 11 is vertically dropped into load position, tape 15 automatically threads properly between rollers 16 and capstans 17 and bears properly against magnetic heads 18 as the tape reels (not shown) properly register onto supporting vertical shafts (not shown). Conversely, when mechanism 11 is raised to its unloaded position, tape 15 is raised above the plane of the rollers 16, capstans 17 and heads 18.

Guide tracks 19, 20 depend rigidly from a loader cover plate 21 to define the upper loader assembly. Cover plate 21 can be seen in all the figures with the exception of Fig. 6. A pair of spaced lug members 22*a*, *b* and 23*a*, *b* project rigidly and laterally from the opposite sides of the upper loader assembly. Respective pairs of lugs 22*a*, *b* and 23*a*, *b* have elongated aligned slots 24 and 25. Slots 24, 25 are always engaged by individual pins 26, 27 extending through the slots, whereby pins 26, 27 simultaneously are slidable as well as pivotal in their individual slots. In addition, pins 26, 27 are individually secured to inwardly turned arm portions 28, 29 of correlated bracket members 30, 31, which members are rigidly fastened to correlated shafts 32, 33 on opposite sides of the upper loader assembly to turn therewith. Shafts 32, 33 are individually supported for turning by respective bracket members 34, 35 fastened to the top of magnetic recorder 12. Each bracket member 34, 35 has a pair of upright arm portions 36, 37 adapted to journal a correlated shaft 32, 33, whereby shafts 32, 33 are adapted to turn freely in either direction about their respective longitudinal axes.

The foregoing pin-and-slot arrangement essentially constitutes a slidable pivot arrangement between shafts 32, 33 and guide tracks 19, 20, respectively, whereby turning of the two shafts simultaneously through equal angles, but in opposite directions, for example one clockwise and the other counterclockwise, will result in vertical displacement of guide tracks 19, 20 from an upper unload position to a lower load position or vice versa, depending upon the direction of turning of the shafts. When cartridge 10 is supported by guide tracks 19, 20, cartridge 10 also participates in such vertical planar displacement from one to the other of two positions. In addition, the foregoing pin-and-slot arrangement is adaptable to limit the excursions of such vertical planar displacements from one to the other of the two positions, and thus is adaptable to determine the plane of the upper position and the plane of the lower position for cartridge 10 and to the same extent is adapted to determine the limits of the turning movement for brackets 30, 31 and the attached shafts 32, 33. However, for convenience, stops may be provided at any suitable location in the assembly to regulate the range of vertical displacement of the assemblage rather than to reply upon the aforesaid pin-and-slot arrangement.

Shafts 32, 33 are ganged to turn simultaneously in opposite directions around their respective axes. To effect such turning, a control knob 38 is fastened to the front end of one of the shafts, for example shaft 32. The ends of both shafts 32, 33 project rearwardly beyond respective upright arms 36, 37 and then bend through 90° as best seen in Figs. 3 to 6, to form turned extensions **32*a*, 33*a* of the main shaft portions. Whereas, one shaft has a downwardly turned extension 32*a*, the other is upwardly turned. Fig. 3 shows the position of the elements constituting the loading mechanism 11 for the loader in its unloaded upper position, whereas Fig. 4 shows the relative positions of the elements when the loader is in its lower and loaded position. The ends of turned shaft extensions 32*a*, 33*a* are pivotally secured to the opposite ends of a long flat link 39. At some mid-position between upper and lower positions, the two shaft extensions 32*a*, 33*a* are vertical and parallel, but turned 180° from each other, that is to say, extension 32*a* points vertically downward whereas extension 33*a* points vertically upward. This occurs because when loader 11 is lowered or raised, shafts 32, 33 rotate about their respective axes which cause extensions 32*a*, 33*a* to swing along the arcs depicted by arrows A in Figs. 3 and 4. Link 39 slants at all times, and its angle of slant will vary only slightly with angular swinging of extensions 32*a*, 33*a* as loader assembly 11 is raised and lowered from one to the other of its two positions. By means of linking shafts 32, 33 by link 39**, it should be evident that turning of one shaft will turn the other through an equal angular shift and this is depicted by the arrows A in Figs. 3 and 4.

A spring 40 is anchored at its upper end to extension **33*a* and the end of link 39. The lower end of spring 40 is anchored to the top surface of magnetic recorder 12. The point of anchorages for spring 40 are selected so that spring 40 will extend vertically at the same time shaft extension 33*a* extends vertically during its angular shifting along arrow A upon operation of the loader mechanism 11. Vertical extension of spring 40 corresponds to an intermediate position of loader assembly 11 as it travels along its arc, arrow A, between its upper unloaded position and its lower loaded position. The foregoing arrangement loads the left end of link 39 (see Figs. 3 and 4) to prevent accidental movement of the apparatus from a position at which it is at rest. For example, when loader 11 is in its upper unloaded position, the upper end of spring 40 is off-set to the left of the vertical line (note Fig. 3) and thus is pulling the pivotal connection of link 39 and shaft extension 33*a* downwardly in a direction to oppose any accidental movement of the assemblage from its rest position. In like manner, when the assemblage is in lower loaded position as shown in Fig. 4, spring 40 is off-set to the right of the vertical line and thus pulling downwardly in a direction against shifting of the apparatus to its upper position. Thus, it will be appreciated that any attempt of movement of loader 11 from either of its rest positions will be resisted by the spring load. Spring 40 is not sufficiently strong to prevent repositioning of loader 11 by its knob 38.**

A pivotal door 41 is hinged at its lower ends to suitable opposed extensions 42 projecting laterally towards each other from each of the forward arms 36, 37. Door 41 carries a latch tongue 43 which co-operates with a catch recess 44 on cartridge 10 upon pivoting door 41 to close position after cartridge 10 has been inserted into its place on guide tracks 19, 20. A spring-loaded latch 45 is pivotally supported on the top of cover plate 21 to turn about its pivot support and spring-loaded by a spring 46 anchored to top plate 21. Upon full insertion of cartridge 10 into loader assembly 11, the rear of cartridge 10 engages the rear extension of latch 45 and turns same against its spring load. Upon opening door 41, the aforesaid arrangement ejects cartridge 10 under the spring load. In addition, the forward end of shaft 33 carries a lateral extension 47 fixed to turn with shaft 33. Extension 47 is oriented such that upon turning of shaft 33, extension 47 swings into alignment with a latch recess 48 on door 41 to lock the door in upright position. Opposite turning of shaft 33 swings extension 47 out of engagement to clear the door for pivoting same to open position.

In operation, magnetic tape 12 or photographic film, if the improvement is being used for a camera, is inserted into cartridge 10 with the full and take-up reels in their proper recess **13*a* and 13*b* and tape 12** or film threaded in a conventional manner.

Cartridge 10 is slidingly inserted between the two guide rails 19, 20 which are in their raised positions. The hinged door 41 is now closed and held closed during the subsequent turning of knob 38 in the direction indicated by arrow 49 in Fig. 1. Shaft 32 will also turn in the direction of arrow 49. Shaft 33 ganged to shaft 32 by their respective extensions and link 39, will turn in the opposite direction. Shafts 32, 33 take the associated brackets 30, 31 with them which causes a lowering of cover plate 21 by means of the pin-slot engagement 26, 27 and 24, 25. Cartridge 10, held between guide rails 19, 20, is lowered therewith. During this lowering action of the cartridge, door latch 43 is engaged with recess 44 on cartridge 10. Simultaneously with such turning, the projection 47 on shaft 33 enters the slot 48 on door 41 to hold same closed during the subsequent operation.

Cartridge 10 fits right on the tape mechanism or into the photographic camera, as the case may be, because it will be understood that loader 11 is so designed that tape 15, after loading, is properly aligned with the magnetic heads, or the film with the lenses, upon lowering same to loaded position. Also, the capstan mechanism now co-operates as intended.

To remove the cartridge, knob 38 is turned in the direction opposite to that indicated by arrow 49. Door latch 43 as well as door slot 48 will be released and cartridge 10 raised from its lower final position to its upper initial position. Spring-loaded latch 45 now urges cartridge 10 to slide forward along guide rails 19, 20 towards and past the now open door 41 for easy removal of the cartridge.

It should be noted that spring 40 is anchored to recorder 12 in a matter, whereby spring 40 is shortest and thus subect to less tension at the two end positions of the pivotal motion of shaft 33, i.e., when cover plate 21 and cartridge 10 assume either their uppermost or their lowermost position. At all other positions, spring 40 will tend to return shaft 33 and with it the loading mechanism to the closer one of the two positions, preventing accidental shifting from one of these positions to the other, or to any intermediate position.

It is intended that all matter contained in the above description or shown in the accompanying drawings shall be interpreted as illustrative and not in a limiting sense.

What is claimed is:

1. In a loading mechanism for a cartridge adapted to receive axially parallel reels, in combination, a frame, two parallel shafts journalled in said frame, two rigidly connected guide rails extending parallel to said shafts and spaced to receive slidingly and support said cartridge, said cartridge sliding in a direction at right angles to the reel axes, two mechanical linkage means, each of said mechanical linkage means connecting an associated one of said shafts and an associated one of said guide rails and converting a pivotal motion of said associated shaft from an initial angular position to a final angular position into a displacement of said associated guide rail from an initial position to a final position, said shafts being ganged for a common angular displacement over the same angular distance, and means for pivoting one of said shafts.

2. In a loading mechanism as defined in claim 1, the displacement of said guide rails occurring substantially in the direction of the axes of said reels, and said shafts being ganged for turning in opposite directions.

3. In a loading mechanism as defined in claim 2, said two parallel guide rails being spaced closer together than said two shafts, said two guide rails being positioned substantially intermediate said two shafts, each of said mechanical linkage means comprising, a pair of spaced arms rigid with and extending substantially inwardly from said associated shaft and towards said associated guide rail, and a pin-and-slot connection between each of said arms and said associated guide rail, the length of the slots being adapted to limit the angular excursion of said associated shaft and the displacement of said associated guide rail.

4. In a loading mechanism as defined in claim 3, a door hinged to said frame and, when closed, extending between said shafts and being located adjacent said cartridge when the latter is in its final position, resilient means urging said cartridge towards said door, and means locking said door in its closed position.

5. In a loading mechanism as defined in claim 3, a mutual locking device on said door and said cartridge retaining the latter in a predetermined position relative to said door when said door is closed and said cartridge has assumed its final position.

6. In a loading mechanism as defined in claim 5, a projection turning with one of said shafts, said door having means located to engage said projection on pivoting of said shaft when said door is in its closed position.

7. In a loading mechanism as defined in claim 1, resilient means urging one of said shafts towards its initial angular position when said shaft is closer to this position than to its final angular position and urging said shaft towards its final angular position when said shaft is closer to this position than to its initial angular position.

8. In a loading mechanism as defined in claim 2, each of said shafts having a bent extension, said shafts being ganged by a link, said link being pivoted to the free end of each of said extensions, said extensions being relatively displaced by 180° when said shafts assume an angular position intermediate to their initial and their final positions, said extensions performing opposite pivotal motions when said shafts turn between the limits defined by their initial and final positions.

9. In a loading mechanism as defined in claim 8, a resilient member anchored to said frame in line with one of said extensions, the free end of said resilient member being secured to that end of said extension which is pivoted to said link.

10. In a loading mechanism as defined in claim 8, a resilient spring member having one end anchored to an end of one of said extensions, the other end of said spring member being anchored to said frame wherein said link is spring loaded in a direction to hold said shafts in their initial and final positions.

11. In a loading mechanism for a cartridge adapted to hold at least a pair of operatively associated reels wherein the reel axes are in parallel relationship, the combination comprising, a frame, a pair of spaced and parallel shafts journalled in said frame, a pair of connected guide rails extending in parallel relationship to said shafts, said guide rails being spaced to receive slidingly and to support said cartridge, said cartridge sliding in the direction at right angles to the reel axes upon inserting said cartridge into said rails, first and second mechanical linkage means, each of said linkage means connecting one of said shafts to a correlated one of said guide rails for converting turning motion of said shafts from an initial angular position to a final angular position into a displacement of said guide rails from an initial position to a final position, said shafts being ganged for a common angular displacement through the same angular distance, and means for pivoting said shafts.

12. In a loading mechanism as defined in claim 11, the displacement of said guide rails occurring substantially in the direction of the reel axes, a link gang connecting said shafts for causing said shafts to turn in opposite directions about their respective axes, each shaft having a bent extension, said link extending between said shafts and having spaced portions pivotally pinned to the respective shaft extensions, said extensions being relatively displaced by 180° when said shafts assume an angular position intermediate their initial and final positions, and said extensions turning in opposite directions about the axes of their respective shafts as said shafts turn between the limits of their initial and final positions for displacing said guide rails.

13. Apparatus as defined in claim 12 further including, return spring means loading said shafts in a direction to hold said shafts in their initial and final positions and to resist turning movement of said shafts away from such positions when the shafts are at rest at such positions.

14. Apparatus as defined in claim 12, said guide rails being located between said shafts, and each of said linkage means comprising, connecting arms extending between the correlated ones of said shafts and guide rails, said arms being keyed to respective ones of said shafts, said arms having a pin and slot connection with respective ones of said guide rails and the length of said slots being adapted to limit angular excursion of said shafts and displacement of said guide rails.

15. Apparatus as defined in claim 12, door means hinged to said frame for opening-closing movement, said door extending upright against said cartridge when in closed position for maintaining said cartridge in said guide rails, and means keyed to one of said shafts for holding said door in closed positions.

References Cited in the file of this patent

UNITED STATES PATENTS

| | | |
|---|---|---|
| 2,322,400 | Sperry | June 22, 1943 |
| 2,466,124 | Owens | Apr. 5, 1949 |